United States Patent
Arnhold et al.

(10) Patent No.: US 11,015,911 B2
(45) Date of Patent: May 25, 2021

(54) EXPLOSION-PROOF HOUSING WITH INNER PRESSURE RELIEF

(71) Applicant: R. Stahl Schaltgeräte GmbH, Waldenburg (DE)

(72) Inventors: Thorsten Arnhold, Pfedelbach (DE); Clife Hermanowski, Seckach (DE)

(73) Assignee: R. Stahl Schaltgeräte GmbH, Waldenburg (DE)

( * ) Notice: Subject to any disclaimer, the term of this patent is extended or adjusted under 35 U.S.C. 154(b) by 0 days.

(21) Appl. No.: 16/617,843

(22) PCT Filed: May 22, 2018

(86) PCT No.: PCT/EP2018/063341
§ 371 (c)(1),
(2) Date: Nov. 27, 2019

(87) PCT Pub. No.: WO2018/219713
PCT Pub. Date: Dec. 6, 2018

(65) Prior Publication Data
US 2020/0149852 A1 May 14, 2020

(30) Foreign Application Priority Data
Jun. 1, 2017 (DE) ...................... 10 2017 112 159.5

(51) Int. Cl.
*F41H 5/06* (2006.01)
*F42C 19/02* (2006.01)
*H05K 5/02* (2006.01)

(52) U.S. Cl.
CPC ............ *F42C 19/02* (2013.01); *H05K 5/0213* (2013.01)

(58) Field of Classification Search
CPC .............. F41H 5/06; F41H 5/24; A62B 99/00
See application file for complete search history.

(56) References Cited

U.S. PATENT DOCUMENTS

| | | | |
|---|---|---|---|
| 3,585,273 A | 6/1971 | Paul | |
| 4,180,177 A | 12/1979 | Gunderman et al. | |
| 6,196,107 B1* | 3/2001 | Hoffman | F42B 39/14 206/3 |
| 6,354,181 B1* | 3/2002 | Donovan | F42B 33/06 110/237 |
| 8,171,837 B2* | 5/2012 | Asahina | F42D 5/045 86/50 |
| 2011/0292575 A1 | 12/2011 | Franco | |
| 2013/0135832 A1 | 5/2013 | Stritzelberger et al. | |

FOREIGN PATENT DOCUMENTS

| | | |
|---|---|---|
| AT | 501 010 B1 | 8/2007 |
| CN | 102263380 A | 11/2011 |
| CN | 104427808 A | 3/2015 |
| CN | 204992397 U | 1/2016 |
| CN | 205354870 U | 6/2016 |
| DE | 1 801 062 A1 | 10/1969 |

(Continued)

*Primary Examiner* — J. Woodrow Eldred
(74) *Attorney, Agent, or Firm* — Blank Rome LLP

(57) ABSTRACT

A housing arrangement comprising a housing wall with internal cavities which contribute to relieving the pressure in the interior and to increasing the deformation resistance of the housing. A housing of this kind can be designed to be large in volume yet light in weight.

20 Claims, 2 Drawing Sheets

(56) References Cited

FOREIGN PATENT DOCUMENTS

| DE | 1 790 184 A1 | 1/1972 |
|---|---|---|
| DE | 28 16 691 A1 | 10/1979 |
| DE | 29 15 504 A1 | 10/1980 |
| DE | 261 063 A3 | 10/1988 |
| DE | 91 03 892 U1 | 5/1991 |
| DE | 198 60 383 B4 | 6/2005 |
| DE | 10 2013 109 259 A1 | 3/2015 |
| DE | 10 2010 016 782 B4 | 12/2016 |

* cited by examiner

EXPLOSION-PROOF HOUSING WITH INNER PRESSURE RELIEF

CROSS-REFERENCE TO RELATED APPLICATIONS

This is a national stage of International Application No. PCT/EP2018/063341 filed May 22, 2018 which claims priority to German Patent Application No. 10 2017 112 159.5, filed Jun. 1, 2017, the entirety of all of which are incorporated by reference herein.

TECHNICAL FIELD

The subject matter of the invention relates to an explosion-proof housing, in particular a housing consistent with protection class Ex-d.

BACKGROUND

Housings consistent with protection class Ex-d are frequently used in explosive areas. Such housings have such a wall thickness that they withstand an ignition of an explosive gas mixture occurring in the housing interior and the subsequent pressure increase. Furthermore, the housings are designed in such a manner that flames or burning particles acting as ignition sources cannot get to the outside. Should there be gaps, they must have a minimum length and must not exceed a maximum width. Furthermore, housing openings are provided with pressure relief bodies which are also referred to as flame protection filters and prevent an explosion ignited in the housing from reaching the outside in order to ignite an explosive mixture existing in the environment.

Publication DD 261 063 A3 describes one example of an explosion-proof housing. The housing illustrated there comprises a porous body arranged in its interior space, said porous body, for example, consisting of slag wool, glass wool or metal or ceramic with open through-pores or through-gaps. This body is intended to lower the explosion pressure by approximately 90%.

Likewise, publication DE 198 60 386 B4 discloses a housing intended for a display screen that has an interior space which is partially filled with a porous explosion pressure damping material. The material has a plurality of channels in the form of pores or gaps, which channels have a small cross-section and are not closed but are continuous. The explosion pressure is to be reduced to only approximately 10 percent of the explosion pressure which would otherwise occur in the empty housing.

For lowering the explosion pressure, the so far introduced housing solutions require damping bodies of considerable volume, as a result of which the interior space of the housing is utilized only inadequately.

In contrast, publication DE 10 2013 109 259 A1 describes an explosion-proof housing of the protection class consistent with "pressure-proof encapsulation" (Ex-d); in this case, there is provided, in the housing wall of said housing, a porous pressure relief body through which an explosion pressure built up in the housing can escape toward the outside. A similar principle is also applied by the housings according to publication U.S. Pat. No. 4,180,177, as well as publication DE 10 2010 016 782 B4.

Furthermore, an advantageous design of a high-voltage switch cabinet has been known from publication DE 1 790 184 A1. It contains several chambers that are separated from each other, however it is not adapted for use in an explosive environment.

Publication DE 1 801 062 C discloses a sheet steel housing for explosive environments to be used in explosive environments, which housing walls consist of sheet steel and are dimensioned regarding their resilience in such a manner that—in the event of an explosion occurring in their interior—they will be plastically deformed and thus stretched. At least one relevant explosion is triggered during the manufacturing process of such a housing, as a result of which the housing is initially imparted with its desired form. The bowing of the walls toward the outside caused by the explosion(s) is intended to improve the deformation resistance of the housing.

SUMMARY

It is the object of the invention to state a concept for a light-weight explosion-proof housing displaying improved resistance to explosions occurring in the housing interior.

This object is achieved with the explosion-proof housing arrangement according to claim 1.

The housing arrangement according to the invention comprises a housing that encloses an interior space that is suitable for the accommodation of components that could form ignition sources. The housing has at least one housing wall, in which at least one internal cavity is provided. The internal cavity is in flow communication with the interior space. The cavity may be closed with respect to the environment. Preferably, there are no components which potentially could form sources of ignition arranged in the cavity.

Due to the formation of internal cavities in the housing wall, the housing wall is imparted with a high deformation resistance at low weight. Furthermore, the wall surfaces of each cavity act in a heat-absorbing manner, so that the cavity contributes to the reduction of pressure peaks and therefore contributes to a reduced mechanical stress on the housing wall. The housing arrangement may in particular be configured as a housing consistent with protection class ex-d ("pressure-proof encapsulation"). Components arranged in the interior space may form ignition sources for an explosive gas mixture, whose explosion remains confined by the housing in such a manner that neither flames nor hot particles—which, in turn could form ignition sources—can escape from the housing. To do so, all openings and gaps that connect the interior space of the housing to the environment are narrow and long such that the escape of flames or hot particles can be reliably precluded.

The cavity may be connected, via one or more passage openings, to the interior space. In doing so, the cavity acts as a cooling and pressure relief volume, as a result of which the pressure peak during an explosion in the interior space is attenuated. Preferably, the cavity has a greater surface/volume ratio than the interior space, so that penetrating gasses can be cooled better than in the interior space.

A pressure relief body may be arranged in the passage opening. This pressure relief body has narrow pores and/or gaps that prevent a flame transmission. This prevents the ignition of gas that is already present in the cavity, which attenuates the explosion and further reduces the pressure peak. Furthermore, such a pressure relief body perfused by gas removes heat and cools the gas, optionally additionally by expansion, e.g., due to the Jule-Thomson effect and/or by adiabatic expansion and/or due to its heat absorption capacity. These effects contribute to the reduction of volume.

The pressure relief body may be a wire mesh sintered body or another sintered body, metallic or ceramic foam or the like.

Preferably, the housing wall has an inner wall facing the interior space and an outer wall delimiting the housing toward the outside, between which walls one or more cavities are formed, as a result of which a high deformation resistance of the housing is achieved with a minimum of material and weight.

The deformation resistance is increased even further when the inner wall and/or the outer wall are ribbed. The inner wall and/or the outer wall may be connected to each other on the ribs, e.g., by welded seams.

The housing wall may be made of two or more shells. Several cavities provided in the housing wall may be connected to one another by way of openings in order to effect a pressure equalization among the cavities. As a result of this, in particular local stress due to off-center ignition or one-sided mitigation of the explosion pressure wave can be minimized.

The housing may have openings to the surrounding atmosphere. Preferably, these are safe against flame transmission and the escape of hot or burning particles, in that the gap widths and gap length are configured consistent with explosion protection standards.

A damping body may be arranged in or on each (the) cavity, which damping body completely or partially fills the cavity. Preferably, the damping body consists of an incombustible material having a large interior surface such as, e.g., metal wool, glass wool, rock wool or the like. Preferably, however, each (the) cavity is free of space-filling installations, components, damping elements and the like. Preferably the cavity is empty.

BRIEF DESCRIPTION OF THE DRAWINGS

Additional details of advantageous embodiments of the invention are the subject matter of the claims, the description or the drawings. They show in FIG. 1 a schematic sectional representation of an explosion-proof housing with cavities for pressure relief, FIGS. 2 to 4 schematic sectional representations of additional embodiments of explosion-proof housings with cavities.

DETAILED DESCRIPTION

Figure 1:
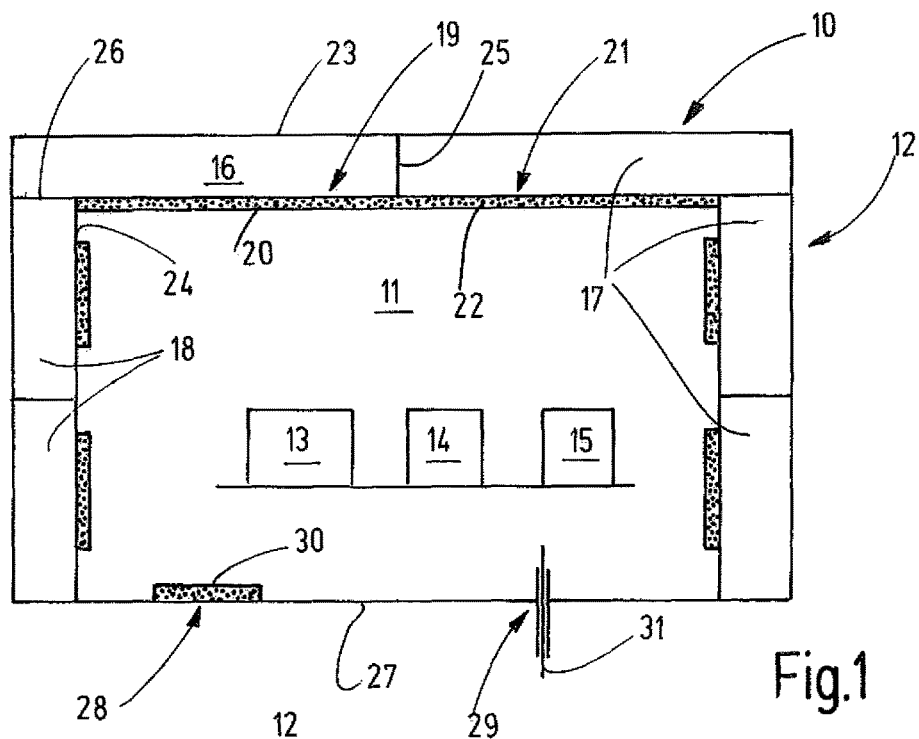

FIG. 1 shows a housing 10 that is configured as an explosion-proof housing. The housing 10 encloses an interior space 11 on all sides with a housing wall 12. Arranged inside the interior space 11 of the housing 10, there are components 13, 14, 15, for example electrical components, that—due to heat exposure, spark development, movement or the like—can form sources of ignition for an explosive gas mixture that penetrated into the interior space 11. The housing 10 is configured in such a manner that an explosion occurring in the interior space 11 cannot damage the housing. Furthermore, the housing 10 prevents the escape of flames and/or hot, in particular burning, particles that could form sources of ignition for an explosive gas mixture prevailing in the environment.

The housing wall 12 has on at least one or more sides of the housing 10 at least one cavity 16, preferably several cavities 16, 17, 18, which are free of components that form sources of ignition. These empty cavities 16, 17, 18 form absorption spaces for a pressure wave originating from the interior space 11 and, at the same time, they contribute to the deformation resistance, i.e., they help increase the stiffness and resilience of the housing wall 12.

The cavity 16 and the interior space 11 are connected to each other by a passage opening 19, in which or on which preferably a pressure relief body 20 is arranged. Preferably, the pressure relief body 20 is a porous body, for example consisting of several wire mesh layers that are connected by sintering to form a rigid body. Alternatively, the body 20 may have been produced by sintering metal particles, in particular metal spheres, ceramic spheres or the like. The pressure relief body 20 is gas-permeable and is adapted to cool a hot or warm gas stream that is passing through. The cooling effect may be based on its heat absorption capacity. Furthermore, cooling may be based on the expansion of the gas stream, in which case the Joule-Thomson effect may become effective.

First and foremost, the pressure relief body 20 is a cooling body. It need not necessarily be flame-arresting because the cavity 16, as well as preferably the other cavities 17, 18, are closed toward the outside. Alternatively, one or more cavities 16, 17, 18 leading toward the outside may comprise openings which are provided with flame-arresting pressure relief bodies.

A propagation of the explosion occurring in the interior space 11 into the cavity 16 and/or 17, 18 need not necessarily be precluded. Therefore, the pressure relief body 20 may also be omitted on the passage opening 19. However, in a preferred embodiment, the pressure relief body 20 is not only provided, in principle, but, in addition, is configured so as to be flame-arresting, as a result of which—should an explosion be ignited in the interior space 11—a propagation of the explosion into the cavity 16 is precluded. In doing so, the cavity 16 acts particularly effectively as a pressure sink.

The description of the cavity 16 of the passage opening 19 and the pressure relief body 20 applies analogously to all other cavities 17, 18 of the housing wall 12, as well as, accordingly, to provided passage openings 21 and pressure relieve bodies 22.

The housing wall 12 has an outer wall 23 and an inner wall 24, between which bar walls 25, 26 may be provided. The bar walls 25, 26 may be configured so as to be continuous and may also separate adjacent cavities 16, 17, 18 from each other or also leave openings exposed or have openings that allow a pressure compensation between adjacent hollow spaces 16, 17, 18.

The bar walls 25, 26 may be an integral component of the housing wall 12 and thus consist of the same material as the outer wall 23 and the inner wall 24, as well as transition seamlessly into these. For example, the housing wall 12 may be made of an aluminum extruded section, which encloses the interior space 11 on three sides, while the bottom, cover and a front wall section 27 are formed by walls fastened thereto, and also comprises one or more shells and has cavities. Other structural designs are possible.

The housing 10 may be configured so as to be closed toward the outside. However, it is also possible to configure it in such a manner that the housing wall 12 has one or more openings 28, 29 on the wall section 27, for example, which openings have a flame-arresting closure however. To do so, the opening 28 may be provided with a pressure relief body 30 which, for example, is configured as a porous, gas-permeable body, similar to the porous body 20, 22. While the porous bodies 20, 22 need not necessarily be flame-arresting, the pressure relief body, however, is flame-arresting. The pores or gaps of said pressure relief body are narrow and long enough, that the escape of flames from the cavity 11 into the environment, as well as the passage of burning or hot particles, can be reliably precluded.

Another opening 29 is shown only as an example for passing through a shaft 31. The shaft 31 or another element arranged in the opening 29 may be moved or be idle. Also other passages for moving or idle components may be configured accordingly. In any event, a gap existing on the passage is narrow and long enough, so that, again, it is flame-arresting.

The housing 10 described so far is configured so as to be explosion-proof. An explosion of a applicable gas mixture ignited in the interior space 11 penetrates—via the optionally existing pressure relief body 20, 22 or also via the passage openings 19, 21 which have been left open—into the cavities 16, 17, 18, which are provided in the housing wall 12. In doing so, they are subject to rapid cooling—on the walls of the cavities 16, 17, 18, which results in a reduction of volume and pressure.

The cooling effect can be enhanced in that the outer wall 23 and/or the bar walls 25 are provided with cooling ribs that extend into the respective cavity 16, 17, and 18. In any event, the ratio of surface to volume of the cavities 16, 17, 18 in all embodiments is preferably greater than the ratio of surface to volume of the interior space 11. Consequently, and due to the effect of the optionally present porous bodies 20, 22, grids, screens or the like achieve a rapid cooling of the gasses which were heated by the explosion and thus a considerable pressure reduction is achieved. Therefore, the housing wall 12 may be made with a relatively thin wall thickness, in which case—due to the arrangement of the cavities 16, 17, 18, i.e., the chambers in the housing wall 12, it is possible to achieve a high deformation resistance. For additionally stiffening the walls and improving cooling, the cavities may be provided with cooling structures, e.g., cooling ribs, which project inward.

Figure 2:
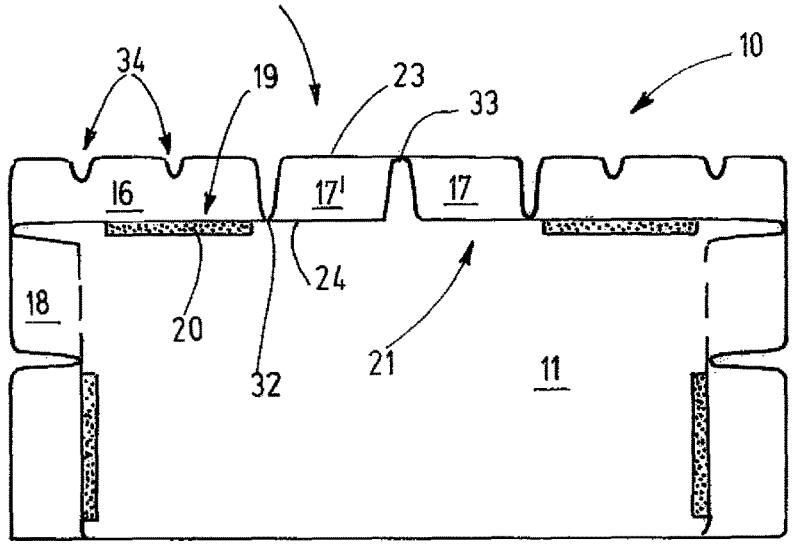

FIG. 2 illustrates a modified structural embodiment of the housing 10, to which the following applies in addition to the description hereinabove:

The outer wall 23 and/or the inner wall 24 of the housing 10 may be provided with ribs, corrugations or the like, in which case each of their peaks is connected at the connecting locations 32, 33 to the respectively other wall. The connecting locations 32, 33 may be welded spots or welded seams or connecting locations produced in another manner. In particular, the outer wall 23 and the inner wall 24 may consist of sheet metal, in particular sheet steel. The connecting locations 32, 33 may be laser welded seams or welded seams produced in another way, with or without filler material. The outer wall 23 may have, in addition to large corrugations, also smaller ribs or beads 34, which, may project outward or, as depicted by FIG. 2, project into a respective cavity 16. The corrugations increase the deforming resistance of the outer wall 23. Likewise, not specifically illustrated corrugations may be provided on the inner wall 24.

Furthermore, it can be inferred from FIG. 2 that at least a few of the cavities, for example cavity 17, may be connected to the interior space 11 via one or more openings, in which case there is no cooling or optionally flame-arresting porous body arranged at this opening. It is also possible to separate individual cavities such as, for example cavity 17', from the interior space 11, so that the gas volume enclosed in the cavity 17' does not communicate with the interior space 11. Still, the cavity 17' is adapted to increase the deformation resistance of the housing wall 12 in this region.

Figure 3:
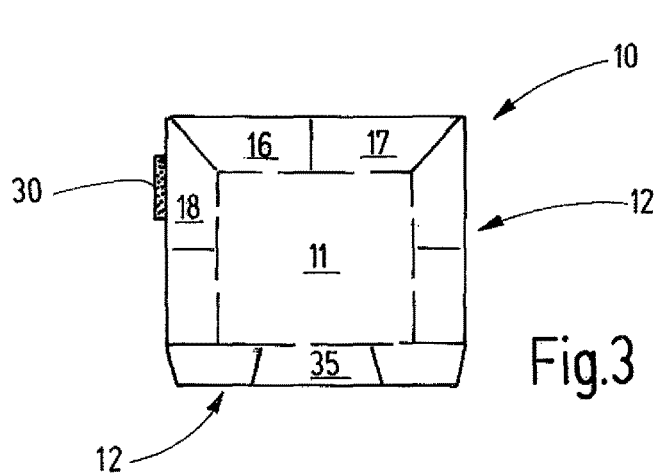

Another modification of the housing 10 is illustrated, highly schematically, by FIG. 3. The description hereinabove applies analogously to all alternatives of the embodiment according to FIG. 3. As shown, it is possible to configure in particular also the front wall section 27 as a profile with one or more cavities, i.e., a chambered profile. One or more of the cavities 16, 17, 18 and/or one of the cavities 35 of the wall section 27 can be provided with a pressure relief body 20, which encloses an opening leading to the outside in a flame-arresting however gas-permeable manner.

The housings 10 described hereinabove, in particular the housing according to FIG. 2, consist of two shells with one outer wall 23 and one inner wall 24 which are directly connected to each other by bar walls 25 or by corrugations. However, a multi-shell construction is also possible as is shown, for example, by FIG. 4.

Figure 4:
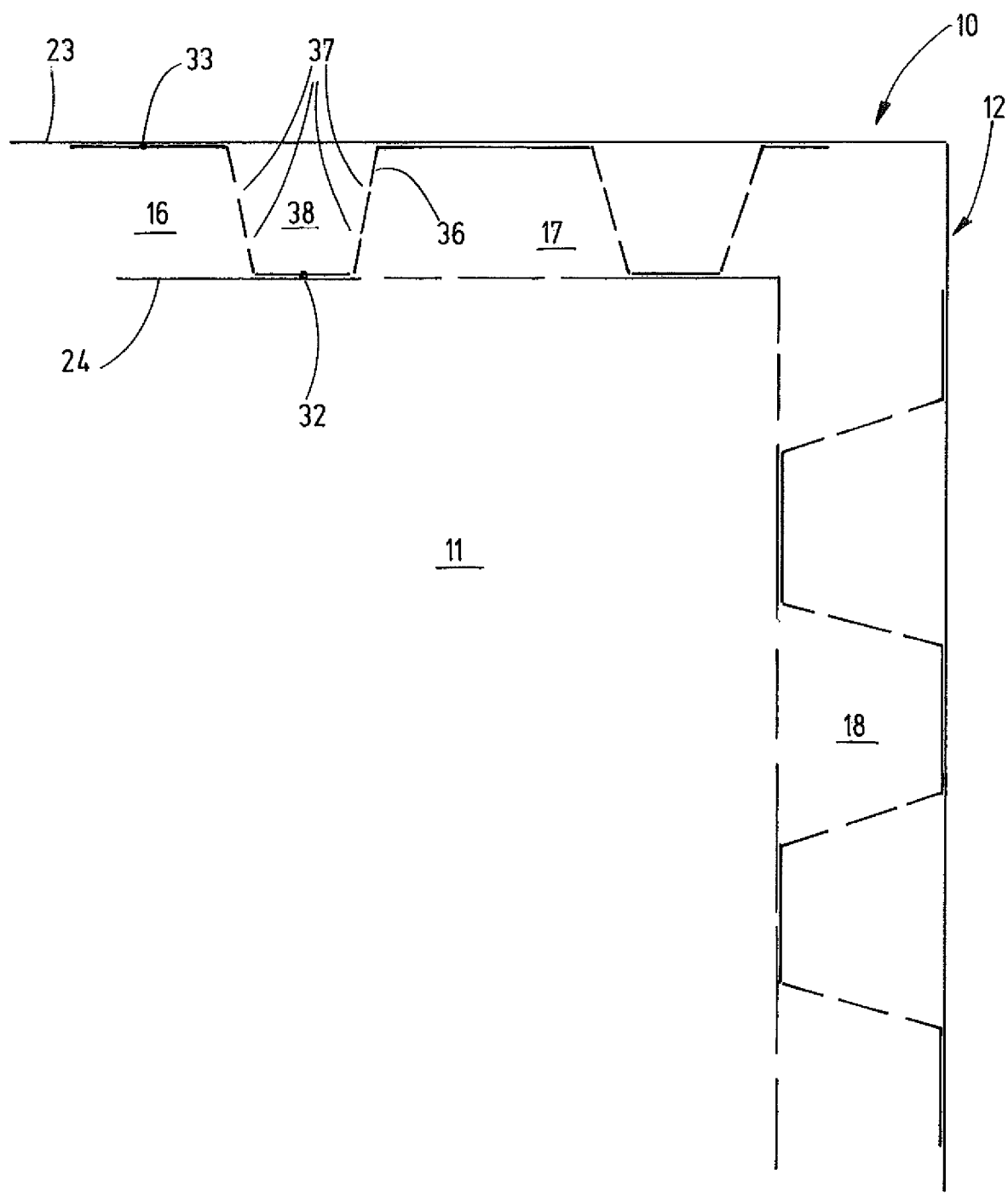

Referring to the embodiment according to FIG. 4, the description hereinabove applies analogously. Considering modifying and supplementary features, it applies that the outer wall 23 and the inner wall 24 are connected to each other by means of an intermediate wall 36, which may be configured with ribs, corrugations, beads or spatial deformations, in order to—on the one hand—be in contact with the outer wall 23 and—on the other hand—be in contact with the inner wall 24, on the other surfaces which face each other. Again, the connecting locations 32, 33, for example in the form of punctiform welding, line welding, strip welding, annular welding or other welding seams for the firm connection of the intermediate wall 36 to the outer wall 23 and the inner wall 24. Again, the inner wall 24 has passages, i.e., openings, which connect the interior space 11 to the cavities 16, 17, 18 formed between the outer wall 23 and the inner wall 24. Additional passages 37 in the intermediate wall 36 form connections between the cavities 16, 17 and also the chambers 38, which may be formed between the outer wall 23 and the intermediate wall 36. The concept according to FIG. 4 results in light-weight housings which, if needed, may have a large volume and be explosion-proof.

The housing arrangement 10 according to the invention comprises a housing wall 12 with internal cavities 16, 17, 18, which contribute to relieving the pressure in the inner space 11 and to increasing the deformation resistance of the housing 12. Such housings can be designed to be large in volume yet light in weight.

| Reference Signs: | |
| --- | --- |
| 10 | Housing |
| 11 | Interior space of the housing 10 |
| 12 | Housing wall |
| 13-15 | Components |
| 16 | Cavity of housing wall 12 |
| 17, 18 | Additional cavities of the housing wall 12 |
| 19, 21 | Passage opening in the housing wall 12 |
| 20, 22 | Porous body |
| 23 | Outer wall |
| 24 | Inner wall |
| 25, 26 | Bar walls |
| 27 | Wall section |
| 28, 29 | Openings |
| 30 | Pressure relief body |
| 32, 33 | Connecting locations |
| 34 | Corrugations |
| 35 | Cavity |
| 36 | Intermediate wall |
| 37 | Passages |
| 38 | Chamber |

The invention claimed is:

1. A housing of protection class ex-d, the housing comprising:

at least four housing walls arranged to enclose an interior space suitable for the accommodation of components which can form sources of ignition, and separating the interior space from an exterior environment, at least three of said housing walls being hollow walls comprising a hollow chamber within the respective housing wall that is closed to the exterior environment, wherein the each of the at least four housing walls comprises sheet metal, and wherein at least one of the hollow walls comprises a passage opening arranged to connect the cavity to the interior space.

2. The housing according to claim 1, wherein a pressure relief body is arranged in the passage opening.

3. The housing according to claim 2, wherein the pressure relief body is a gas-permeable body having pores and/or gaps.

4. The housing according to claim 2, wherein the pressure relief body is a wire mesh sintered body.

5. The housing according to claim 1, wherein each of the housing walls comprises an inner wall facing the interior space and an outer wall facing the exterior environment.

6. The housing according to claim 5, wherein the inner wall is ribbed.

7. The housing according to claim 5, wherein the outer wall is ribbed.

8. The housing according to claim 6, wherein the inner wall and the outer wall comprise respective ribbed portions are connected to each other at the ribbed portions.

9. The housing according to claim 1, wherein each of the housing walls comprises multiple shells.

10. The housing according to claim 1, wherein at least one of the hollow walls comprises openings connecting the respective hollow chamber to the exterior environment.

11. The housing according to claim 2, wherein the pressure relief body is a flame arrestor.

12. A flame-proof or explosion-proof housing comprising:

at least four housing walls arranged to enclose an interior space suitable for the accommodation of components which can form sources of ignition, and separating the interior space from an exterior environment, at least three of said housing walls being hollow walls comprising a hollow chamber within the respective housing wall that is closed to the exterior environment, wherein the each of the at least four housing walls comprises sheet metal, and wherein at least one of the hollow walls comprises a passage opening arranged to connect the cavity to the interior space.

13. The housing according to claim 12, wherein a pressure relief body is arranged in the passage opening.

14. The housing according to claim 12, wherein the pressure relief body is a gas-permeable body having pores and/or gaps.

15. The housing according to claim 12, wherein the pressure relief body is a wire mesh sintered body.

16. The housing according to claim 15, wherein the pressure relief body is a flame arrestor.

17. A housing of protection class ex-d, the housing having a plurality of sides and comprising:

one or more walls comprising sheet metal and arranged to enclose an interior space suitable for the accommodation of components which can form sources of ignition, such that the interior space is separate from an exterior environment, the one or more walls having a first wall portion on a at least three of the plurality of sides of the housing, and a second wall portion on the remaining sides;

wherein the first wall portion comprises one or more hollow walls, each with a hollow chamber that is closed to the exterior environment, at least one of the one or more hollow walls comprising a passage opening arranged to connect the cavity to the interior space.

18. The housing according to claim 17, wherein a pressure relief body is arranged in the passage opening.

19. The housing according to claim 17, wherein the pressure relief body is a gas-permeable body having pores and/or gaps.

20. The housing according to claim 17, wherein the pressure relief body is a wire mesh sintered body.

* * * * *